H. W. CHURCHMAN AND J. N. WHITE.
HARVESTING MACHINE
APPLICATION FILED SEPT. 12, 1919.

1,367,861.

Patented Feb. 8, 1921.
7 SHEETS—SHEET 1.

Inventors
H. W. Churchman
J. N. White
By ... Atty.

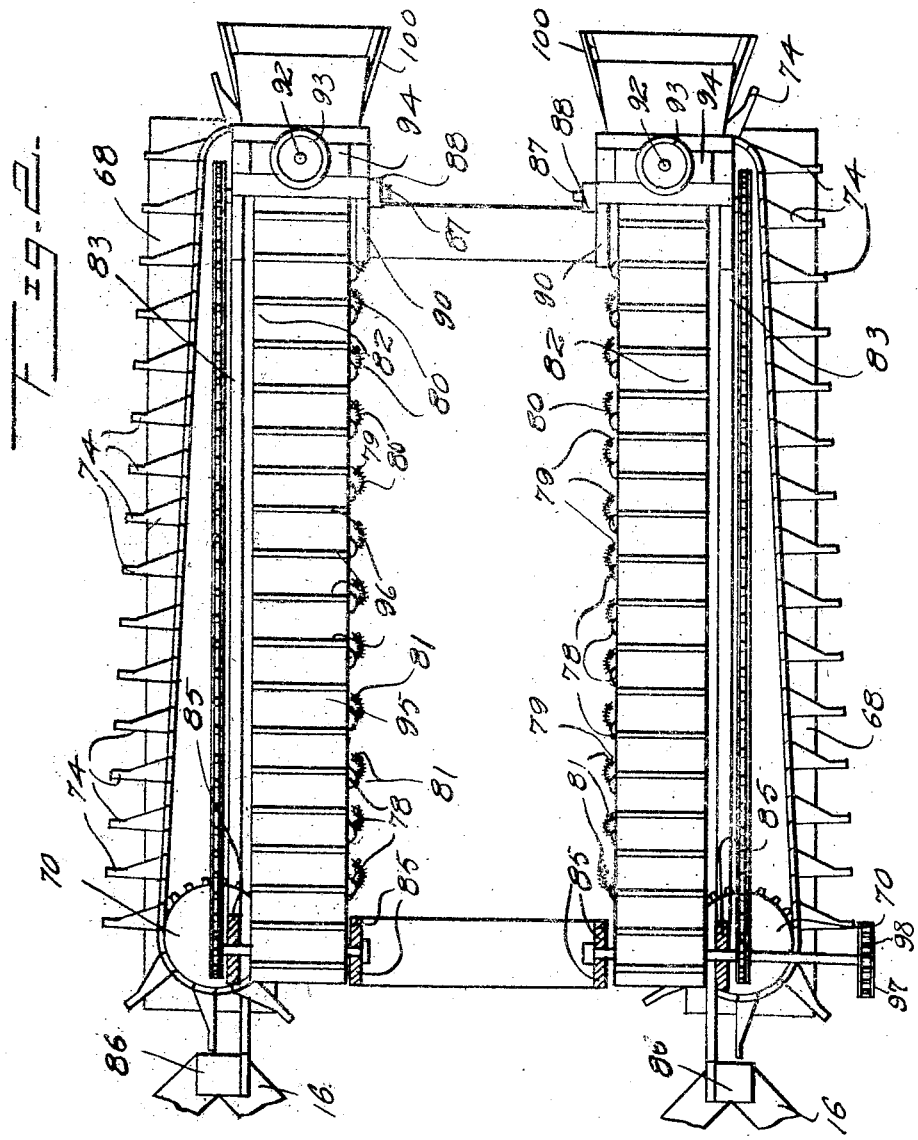

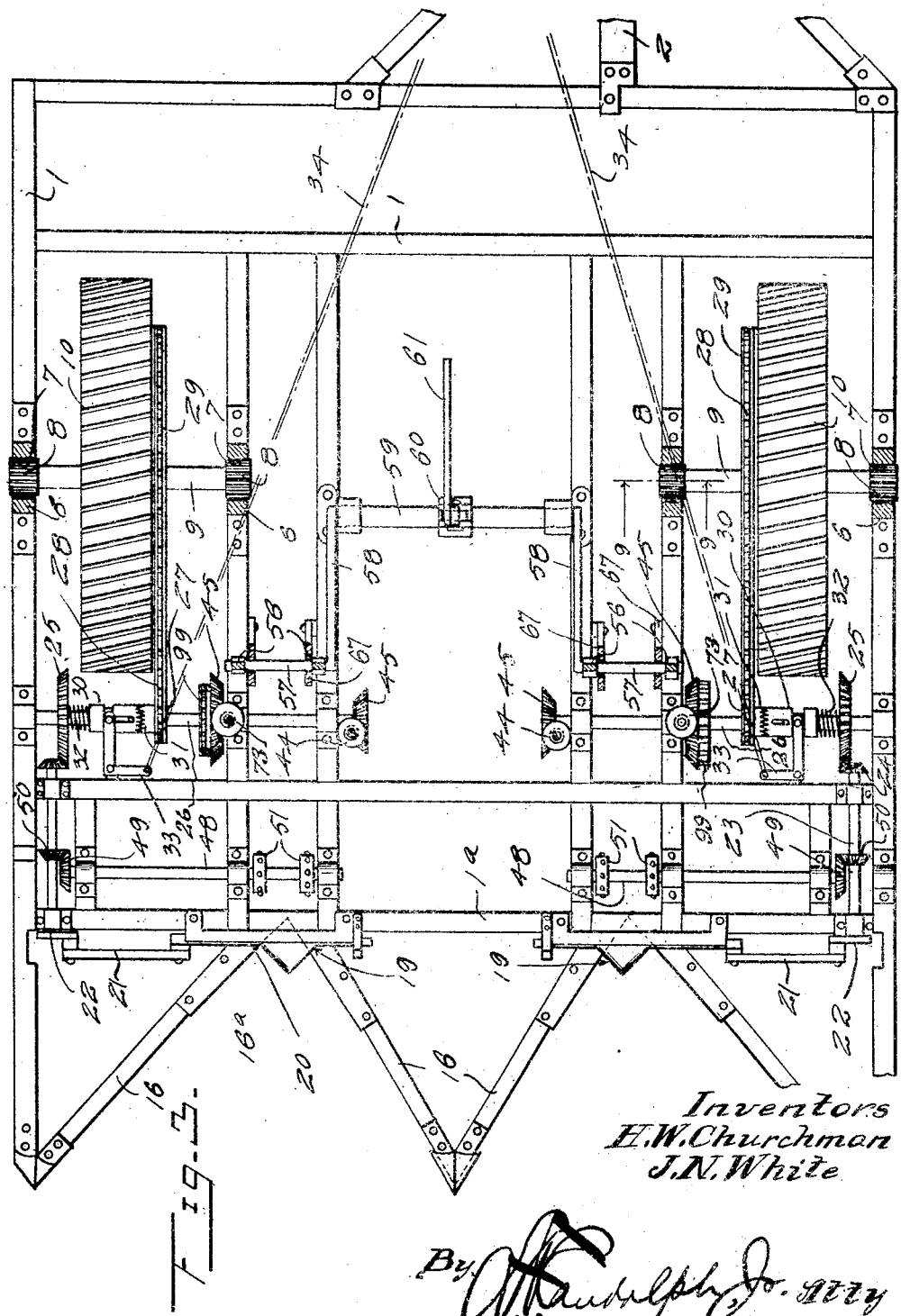

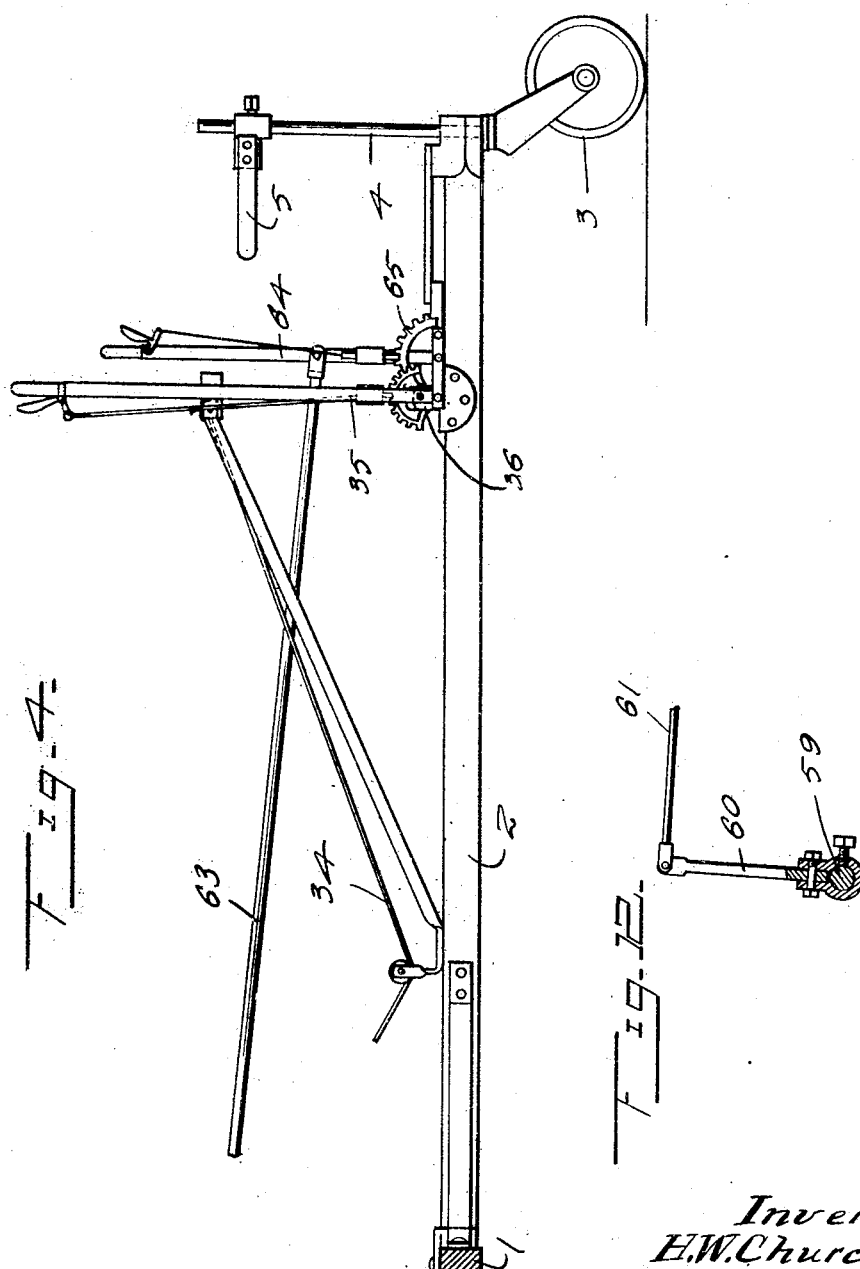

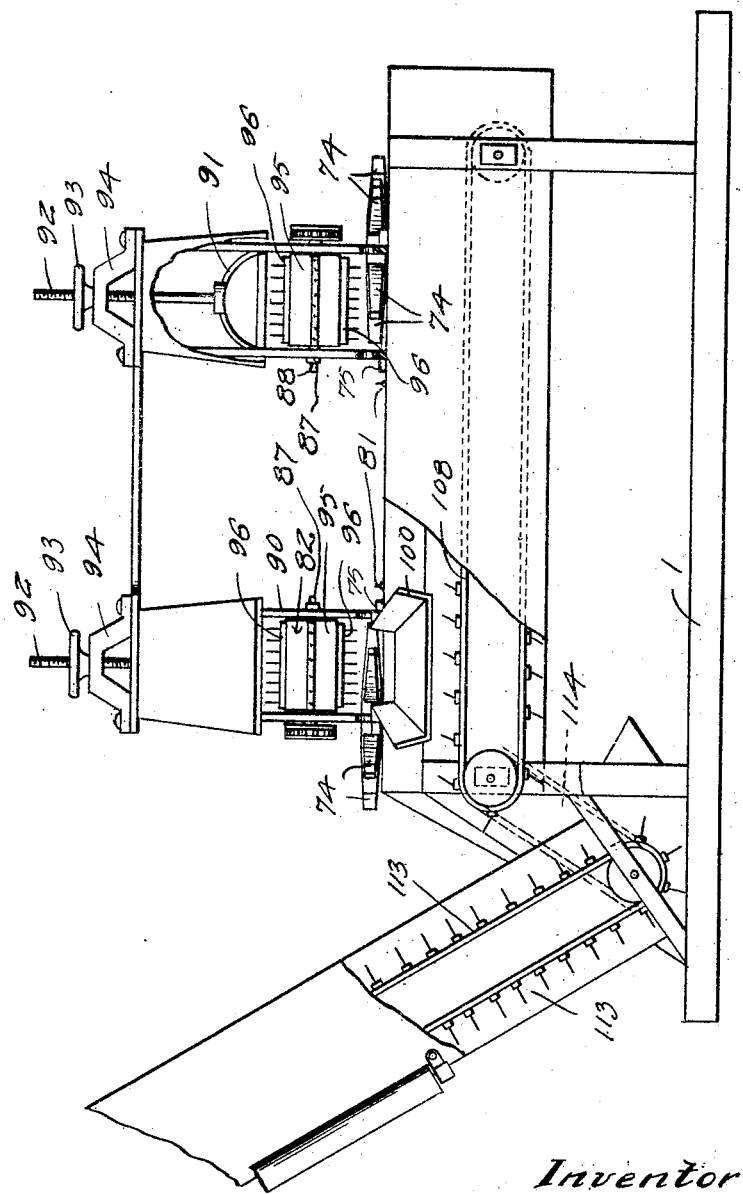

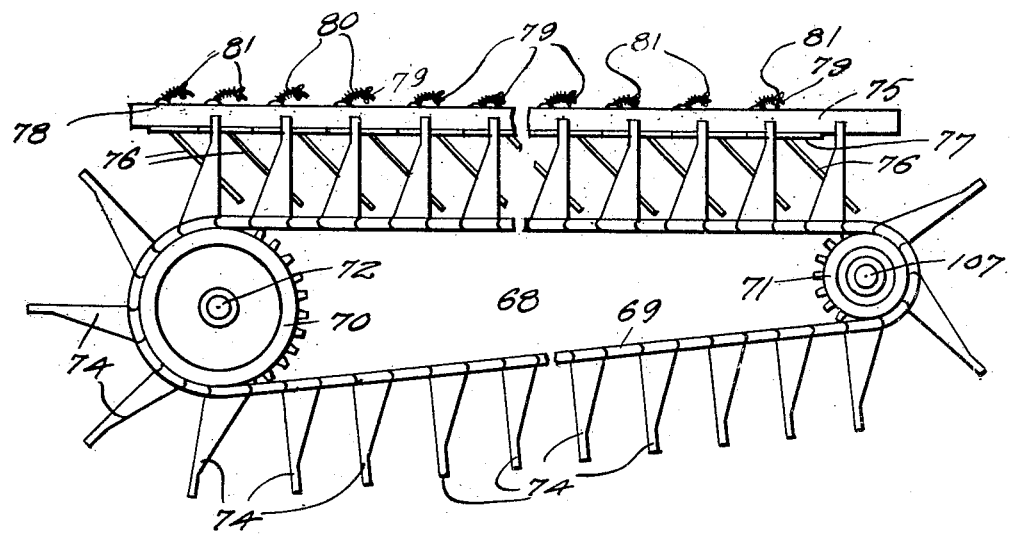
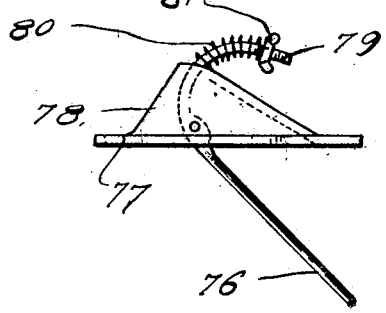
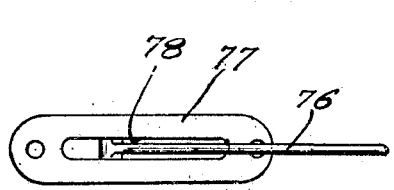

H. W. CHURCHMAN AND J. N. WHITE.
HARVESTING MACHINE.
APPLICATION FILED SEPT. 12, 1919.
1,367,861.
Patented Feb. 8, 1921.
7 SHEETS—SHEET 7.
Fig. 10.
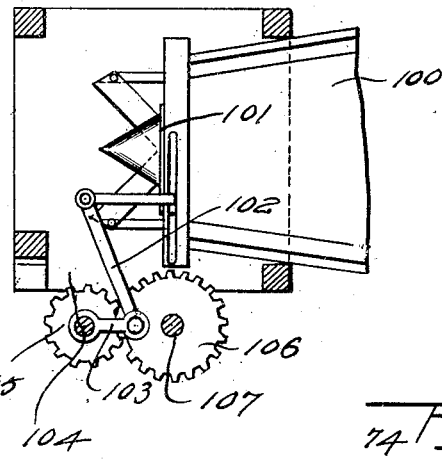
Fig. 11.
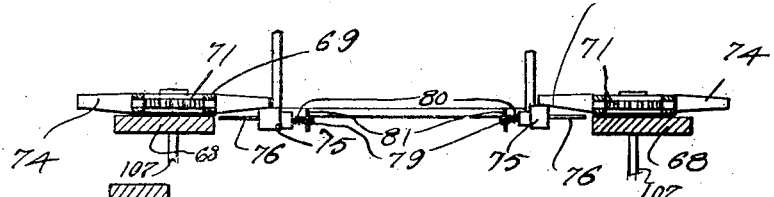
Fig. 9.
Inventors
H. W. Churchman
J. N. White
By [signature], Atty.

UNITED STATES PATENT OFFICE.

HENRY W. CHURCHMAN AND JOSEPH N. WHITE, OF GUYMON, OKLAHOMA.

HARVESTING-MACHINE.

1,367,861.  Specification of Letters Patent.  Patented Feb. 8, 1921.

Application filed September 12, 1919. Serial No. 323,278.

*To all whom it may concern:*

Be it known that we, HENRY W. CHURCHMAN and JOSEPH N. WHITE, citizens of the United States, residing at Guymon, in the county of Texas and State of Oklahoma, have invented certain new and useful Improvements in Harvesting-Machines; and we do hereby declare the following to be a full, clear, and exact description of the invention, such as will enable others skilled in the art to which it appertains to make and use the same.

This invention relates to harvesting machines, and more particularly to a machine specially adapted for harvesting maize.

One of the main objects of the invention is to provide a machine of the character stated which is specially adapted for harvesting maize, this machine serving to sever the heads from the stalks of the maize so as to permit the grain to be easily recovered. A further object is to provide a machine which is capable of cutting two rows of maize plants simultaneously, the cut plants being elevated and conveyed rearwardly of the machine and the head severed from the stalks which are deposited upon the ground, the severed heads being collected and discharged into a wagon or other suitable receptacle. Another object is to provide a machine having evening means for insuring proper severing of the heads from the stalks, this evening means being adapted to compensate for the differences in height of the stalks which is characteristic of the maize plant. Further objects will appear from the detailed description.

In the drawings:

Fig. 2 is a top plan view of the upper conveyer and parts associated therewith.

Fig. 3 is a top plan view of the main supporting frame and associated parts, the upper conveyer and parts associated therewith being omitted for clearness.

Fig. 4 is a side view of the push bar.

Fig. 5 is a back view of the harvester.

Fig. 6 is a detail of one of the top conveyers and holding means.

Fig. 7 is a detail of one of the holding members.

Fig. 8 is a view showing the holding member in elevation.

Fig. 9 is a section taken substantially on line 9—9 of Fig. 3.

Fig. 10 is a detail top plan view of the upper portion of the discharge chute and the cutting mechanism supported thereby.

Fig. 11 is a section taken substantially on line 11—11 of Fig. 1.

Fig. 12 is a detail of the lever 60.

Figure 1:
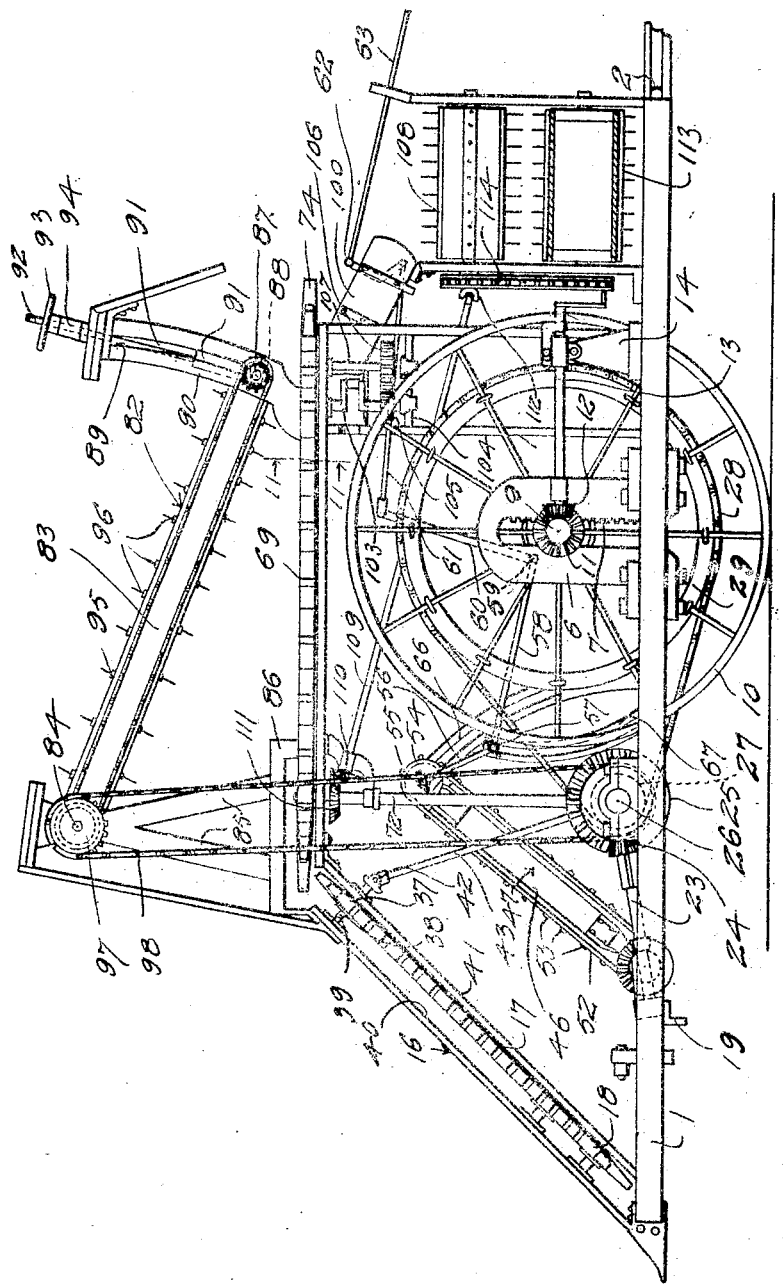
Figure 1 is a side view of a harvester constructed in accordance with our invention.

The harvesting machine includes a main frame designated generally by 1 of substantial rectangular outline, this main frame including suitable transversely and longitudinally extending brace and supporting bars, as illustrated. This main frame is provided at its rearward end with a push bar 2 secured thereto, this push bar being provided at its outer end with a caster wheel 3 for steering the push bar, and consequently the main frame, this caster wheel having the stem 4 of its fork extended and provided with a steering lever 5 secured thereon. As will be readily understood, the push bar is adapted to be connected to a tractor in any suitable or well known manner for pushing the machine along the rows of plants to be harvested.

The main frame 1 is provided at each side thereof with a pair of vertically slotted standards 6, one of the inner walls of each of these standards being toothed to provide rack elements 7 adapted for engagement by spur pinions 8 secured on shafts 9 which rotatably support ground wheels 10. Each shaft 9 is provided at its outer end with a bevel-gear 11 secured thereon, this gear meshing with a pinion 12 secured on adjusting shaft 13 rotatably mounted in a bearing carried by standards 6 and in a standard 14, the shaft 13 and parts associated therewith providing means whereby the main frame 1 may be readily adjusted toward and away from the ground surface to suit conditions.

Main frame 1 carries an upper frame or super-structure which coöperates with the main frame to support the various mechanisms for harvesting and heading the maize. At the front of the main frame there are a plurality of downwardly and forwardly inclined guide members 16, these members being of substantial V-shaped to provide rearwardly converging passages for reception of the stalks of maize. Each of these members 16 includes an endless chain conveyer 17 provided with outwardly directed teeth or spurs 18 for engagement with the stalks of maize so as to move the same rearwardly of the machine.

A suitable cutting mechanism designated generally by 19 is mounted on the front bar 1ª of the main frame at the inner end of each of the rearwardly converging stalk receiving passages 16ª. This cutting mechanism includes a reciprocatory sickle bar 20 which is reciprocated longitudinally of bar 1ª by means of a pitman 21 eccentrically pivoted to a disk 22 secured on the forward end of a shaft 23, the rearward end of which is provided with a bevel-gear 24 secured thereon and meshing with a bevel-gear 25 secured on a countershaft 26 disposed transversely of the main frame. This countershaft is provided with a sprocket wheel 27 secured thereon connected by a chain 28 to a sprocket ring 29 secured on ground wheel 10. Rotation of the countershaft is controlled by a clutch member 30 feathered thereon and movable into and out of engagement with a clutch member 31 of the sprocket 27, the clutch member 30 being normally held in operative position by an expansion spring 32 mounted about the countershaft and confined between the clutch member and bevel-gear 25. The clutch is shifted by a lever 33 connected by a cable 34 to a main clutch shifting lever 35 carried by the push bar 2, this lever being provided with a spring pressed detent coöperating with a quadrant 36 in the known manner. By this means, the machine may be readily thrown into and out of operation.

As will be readily understood, each of the outer guide members or casings 16 is provided adjacent its inner edge with a chain conveyer 17, and the central member 16 is provided at each of its lateral edges with a similar conveyer. The chain 17 passes at its lower end about suitable guide sprockets, and at its upper end about a drive sprocket wheel 37 secured on a stub shaft 38 having its upper end portion rotatably mounted in a bearing sleeve 39 secured to the under face of the top board 40 of the casing, this shaft projecting through the bottom board 41 of this casing which constitutes a table for preventing slackness of the chain 17. The lower end of shaft 38 is connected by a universal joint 42 to the upper end of a transmission shaft 43 provided at its lower end with a bevel-pinion 44 which meshes with a bevel-gear 45 secured on countershaft 26 each countershaft being provided with two-bevel gears 45, as illustrated in Fig. 3, it being understood that the respective pinions 44 and gears 45 are so related as to cause proper travel of the chain conveyer 17 for forcing the stalks engaged thereby upwardly and rearwardly of the machine.

An upwardly and rearwardly inclined butt conveyer 46 is positioned below and in rear of each set or pair of members 16 so as to engage the lower ends or butts of the stalks severed by the cutting mechanisms 19 as they are moved upwardly and rearwardly of the machine. The conveyer 46 includes a frame 47 which is rockably supported adjacent its lower end upon a counter shaft 48 rotatably supported on the main frame in advance of, and in parallelism with, the countershaft 26. Shaft 48 is provided at its outer end with a bevel-gear 49 secured thereon and meshing with a bevel-gear 50 secured on shaft 23. At its inner end portion, shaft 48 is provided with spaced rollers 51 which drive an endless belt 52 passed about the same and provided with a plurality of spaced transverse strips 53. At its upper end the belt 52 passes about spaced pulleys 54 secured on a shaft 55, this shaft serving to support the upper end of the frame 47. The shaft 55 is rotatably supported in the upper end of a pair of links 56. These links are pivotally connected at their lower ends to a horizontal arm 57 of a crank 58 of a crank shaft 59 rockably mounted at the central portion of the main frame and disposed transversely thereon. This shaft is provided with an arm 60 adjustably secured thereon, the upper end of which is connected by a pull rod 61 to one arm of a bell crank lever 62 the other arm of which is connected by an adjusting rod 63 to an adjusting lever 64 mounted upon push bar 2 and provided with a spring pressed detent coöperating with a quadrant 65 for securing the lever in adjustment. To prevent excessive looseness or play of the upper end portion of the butt elevator 46, shaft 55 operates in arcuate guide frames 66, each of which is curved on an arc concentric with the countershaft 48, and crank arm 57 operates in guide frames 67 disposed concentric with shaft 59. By this means, the elevator 46 may be readily rocked about the shaft 48 so as to have its inclination varied to suit circumstances.

The upper frame or super-structure 15 supports, adjacent each side thereof, a table 68 which extends longitudinally of the machine and serves to support the outer run of a horizontally disposed chain conveyer 69. This conveyer is passed about a forward drive sprocket wheel 70 and a rearward wheel 71, the forward wheel being secured upon the upper end of the vertically disposed shaft 72 provided at its lower end with a bevel-gear 73 secured thereon and meshing with one of the gears 45 secured on the countershaft 26. The conveyer 69 is provided with a plurality of uniformly spaced outwardly directed stalk engaging members or spurs 74, each of these spurs being of substantial triangular shape and having its rearward face as considered from the direction of travel of the conveyer disposed substantially at a right angle to the chain, the other face of this spur member being inclined, as clearly illustrated in Fig. 6. This conveyer is so positioned that the spurs 74 of the inner run thereof engage the cut stalks as they are delivered from the upper ends of the conveyers 17 so as to force these stalks rearwardly of the machine. The outer end portions of the spurs 74 of the inner run of the conveyer 69 travel upon the upper edge of a bar 75 disposed in parallel spaced relation to the inner run of the conveyer. This bar carries a plurality of spring pressed stalk engaging members 76 which are positioned beneath the spurs 74 of the inner run of the conveyer and are inclined toward the conveyer and rearwardly of the machine. Each of these members 76 is carried by a longitudinally slotted base plate 77 carrying a supporting arm 78 in which the member 76 is pivoted, the outer portion of this arm being longitudinally slotted to receive the curved end portion 79 of the stalk engaging member 76. An expansion spring 80 is mounted about the outer portion of this curved extension and is confined between arm 78 and a wing nut 81 screwed onto the rod so that the pressure tending to force member 76 inwardly toward the inner run of the conveyer may be readily varied to suit conditions. As will be more clearly noted from Fig. 6, the members 76 act, due to their rearward inclination, to force the stalks of maize outwardly so as to be positioned closely adjacent the bases of the spurs 74. Also, during travel of the conveyer, the stalks are alternately engaged by and released from the members 76 so as to permit downward passage of the stalks between the spurs. This downward movement of the stalks between the spurs 74 is positively limited by the heads of the maize. the spurs being so positioned as to prevent passage of the maize heads therebetween. In this manner, the members 76 and spurs 74 coöperate to adjust the maize stalks so as to position the heads of the maize in a common horizontal plane during rearward movement of the inner run of the conveyer 69.

To insure the positioning of the heads of maize in a common plane during rearward movement of the inner run of the conveyer 69, we provide a supplemental device or evener 82. This evener comprises a supporting frame 83 the upper end of which is rockably supported by a shaft 84 rotatably mounted in supporting standards 85 secured at their lower ends to substantially U-shaped braces 86 secured to the table 68 and the upper ends of the casing of members 16. The lower end of the conveyer frame 83 is supported by a shaft 87 rotatably supported in bearing blocks 88 adjustable in arcuate slots 89 concentric with shaft 84 provided in the arms of the substantially U-shaped frame 90 supported by the super-structure 15 about the rearward end of the conveyer 82. The bearing blocks 88 are carried by the arms of a yoke 91 which is adjusted in the frame 90 by means of an adjusting screw 92 the lower end of which is secured to the center of the bight portion of the yoke, an adjusting wheel 93 being screwed on the upper end portion of this screw and engaging a bracket 94 through which the screw is passed. The evener includes an endless belt 95 passed about suitable pulleys or rollers on the shafts 84 and 87, this belt being provided on its outer face with a plurality of uniformly spaced transversely extending strips 96. A sprocket wheel 97 is secured on the outer end of shaft 84 and is connected by a chain 98 to a sprocket wheel 99 secured on the counter shaft 26. As will be clear from Fig. 1 of the drawings, the evener acts to force the maize stalks downwardly through the inner run of the conveyer 69 and, due to its downward and rearward inclination relative to this conveyer, insures that the heads of the maize will be forced downwardly to such an extent as to be in engagement with the upper faces of the spurs 74, thus insuring that the maize heads carried by the inner run of the conveyer 69 will be positioned in substantially the plane of the conveyer before they reach the discharge end thereof.

The conveyer 69 discharges into a downwardly and rearwardly inclined chute 100, the upper end of which extends forwardly beneath the conveyer and supports a cutting mechanism similar to the cutting mechanisms 19 including a reciprocable cutter bar 101 connected by a pitman 102 to a crank shaft 103 supported by table 68 and a platform 104 carried by the super-structure, this crank shaft being provided adjacent its lower end with a spur pinion 105 meshing with a gear 106 secured on a shaft 107 which passes through the table 68, the sprocket wheel 71 being secured upon the upper end of this shaft. This cutting mechanism serves to sever the stalks from the head prior to discharge of the heads from the conveyer, after which the heads are discharged into the trough 100. The trough serves to direct the severed heads onto the upper run of a horizontally disposed conveyer 108 positioned at the back of the main frame 1 and disposed transversely thereof. This conveyer is driven by a shaft 109 provided at its forward end with a bevel-pinion 110 meshing with a bevel-gear 111 secured upon the shaft 72, and said shaft is connected by a universal joint 112 to one roller of the conveyer. Conveyer 108 discharges onto the upper run of an elevator 113 which projects laterally of the main frame, driving connections being established between the conveyer and this elevator by a sprocket chain 114 passing about a sprocket wheel secured on shaft 109 and about a corresponding sprocket wheel secured upon the shaft of one of the rollers of the elevator. The maize heads which have been thus severed from the stalks are elevated and discharged into a wagon which may be driven at the side of the machine, and the stalks which have been severed from the heads are permitted to fall upon the ground.

In carrying our invention into effect, it may be found desirable to make slight changes in construction and arrangement of the details of various parts of the machine, and we intend to include all such variations, as fall within the scope of the appended claims, in this application in which a preferred form only of our invention is disclosed.

What we claim is:

1. In a harvester for headed grain, a portable supporting frame, stalk cutting and conveying means carried thereby for severing stalks and feeding the same rearwardly of the frame, means for receiving the severed stalks from said cutting and conveying means and for conveying the same rearwardly of the machine to a point of discharge, said receiving means being adapted to permit downward movement of the stalks so as to be suspended by the heads thereof, means for causing longitudinal vertical upward movement of the severed stalks preliminary to discharge thereof from the cutting and conveying means so as to insure positioning of the heads of the stalks above said receiving means, and means for severing the stalk from the head while suspended by the receiving and conveying means.

2. In a harvester, a portable supporting frame, means for cutting stalks and for conveying the same rearwardly of the machine in substantially vertical position, means for engaging the butt ends of the severed stalks so as to force the same upwardly to have the heads of the stalks positioned above a predetermined horizontal plane, means positioned to receive the severed stalks from said cutting and conveying means and convey the same rearwardly of the machine by their heads, and means for severing the stalks from the heads during travel thereof with said receiving and conveying means.

3. In a harvester for headed grain, a portable supporting frame, a horizontal stalk receiving conveyer having outwardly projecting members for engagement with the severed stalks for conveying the same rearwardly of the harvester, the members of the conveyer being so spaced as to prevent passage between the same of the heads of the stalks, pivotally mounted means for preventing passage of the stalks from between the members of the conveyer without interfering with movement of the conveyer, means for cutting stalks and for delivering the same to said conveyer in vertical position, and means for severing the stalks from the heads during travel thereof with said receiving conveyer.

4. In a harvester for headed grain, a portable frame, a horizontally disposed receiving conveyer provided with outwardly projecting members for engaging severed stalks, said members being so spaced as to permit downward movement of the stalks between the same while preventing passage of the heads between the members, means coöperating with one run of the conveyer for preventing the stalks from passing from between the members thereof laterally of the conveyer, said means being movably mounted and yieldably held in a normal position, means for cutting the stalks and for conveying the same to the receiving conveyer in vertical position, and means positioned adjacent the discharge end of said receiving conveyer for severing the stalks from the heads.

5. In a harvester for headed grain, a portable frame, a horizontally disposed conveyer carried by said frame, said conveyer being provided with outwardly projecting stalk engaging members so spaced as to permit downward movement of stalks therebetween while preventing passage of the heads, fingers pivotally mounted adjacent one run of the conveyer for intermittently engaging stalks carried thereby so as to prevent passage of the stalks from between the conveyer members laterally of the conveyer while permitting ready downward movement of the stalks so as to be suspended by their heads from said conveyer, said fingers being provided with curved shanks having resilient means mounted thereon to yieldably retain the fingers in a normal position, means for cutting stalks and for conveying the same to the receiving end of the receiving conveyer with the heads of the stalks above the plane of the conveyer, and means positioned adjacent the discharge end of said receiving conveyer for severing the stalks from the heads.

6. In a harvester for headed grain, a portable frame, a horizontally disposed receiving conveyer carried by said frame and provided with a plurality of outwardly projecting stalk engaging members, means adjacent the inner run of said conveyer for preventing passage of stalks from between said conveyer members laterally of the conveyer while permitting downward movement of the stalks between the conveyer members, the stalk engaging members of the conveyer being so spaced as to prevent passage of the heads of the stalks, means for cutting stalks and for conveying the same to the intake end of said conveyer in substantial vertical position, adjustable means for causing vertical upward movement of the cut stalks relative to said cutting and conveying means prior to delivery of the stalks to the receiving conveyer so as to position the heads of the stalks above the plane of the receiving conveyer, and means adjacent the discharge end of said receiving conveyer for severing the stalks from the heads.

7. In a harvester for headed grain, a portable frame, means carried thereby for cutting stalks and for conveying the same rearwardly of the frame in substantial vertical position, an inclined butt engaging elevator positioned in rear of and below said cutting and conveying means for engaging the butts of cut stalks and for forcing the same upwardly so as to have the heads of the stalks positioned above a predetermined horizontal plane when the stalks are discharged from said cutting and conveying means, a horizontally disposed receiving conveyer positioned to receive stalks discharged from the cutting and conveying means and provided with a plurality of outwardly projecting members adapted to engage the stalks beneath the heads thereof, said members being so spaced as to permit downward movement of the stalks therebetween while preventing passage of the heads, means associated with the inner run of the receiving conveyer for preventing passage of the stalks from between said stalk engaging members laterally of the conveyer, and means adjacent the discharge end of said receiving conveyer for severing the stalks from the head.

8. In a harvester for headed grain, a portable supporting frame, a horizontally disposed stalk receiving conveyer supported by said frame and having its inner run traveling rearwardly thereof during advancement of the harvester, said receiving conveyer being provided with outwardly projecting stalk engaging members spaced to permit ready downward movement therebetween of the stalks while preventing passage of the heads thereof, a plurality of resiliently pressed rearwardly inclined stalk engaging members positioned adjacent the inner end of the conveyer and coöperating with the stalk engaging members thereof to prevent the escape of the stalks laterally of the conveyer while facilitating downward movement of the stalks between the stalk engaging members of said conveyer, stalk cutting and conveying means positioned in advance of said receiving conveyer and to deliver cut stalks thereto in substantial vertical position, means for engaging the stalks and for raising the same prior to their delivery to the receiving conveyer so as to have the stalk heads positioned above the plane of said conveyer, a discharge chute positioned adjacent the discharge end of said receiving conveyer, and means for severing the stalks suspended from the receiving conveyer from the heads in advance of said chute, the severed heads being discharged into the chute so as to be separated from the stalks.

In testimony whereof we affix our signatures in presence of two witnesses.

HENRY W. CHURCHMAN.
JOSEPH N. WHITE.

Witnesses:
H. A. SALTER,
ENOCH P. CARTER.